April 22, 1924.
H. W. JOCKERS ET AL
DETACHABLE BRAKE LINING
Filed March 29, 1922
1,490,926
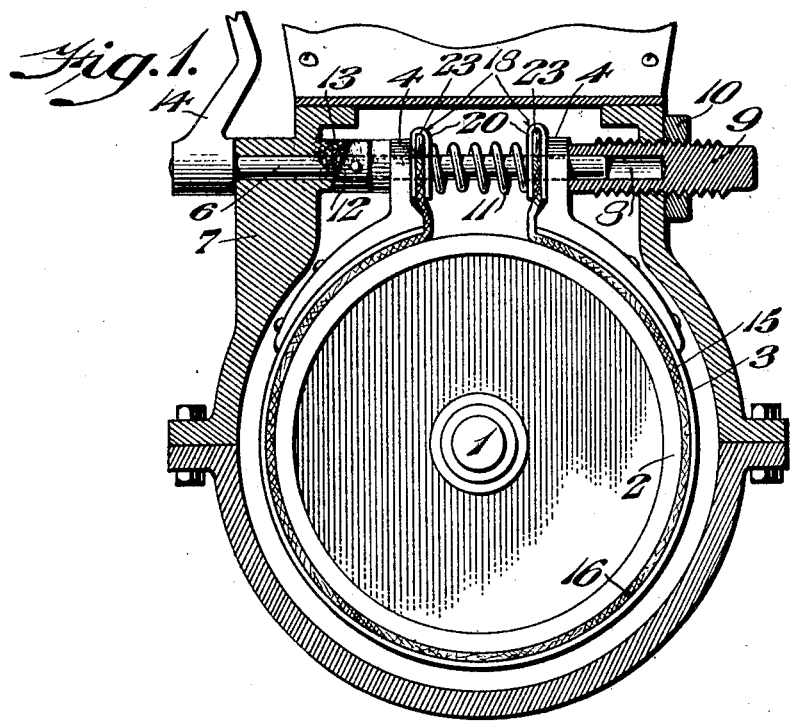
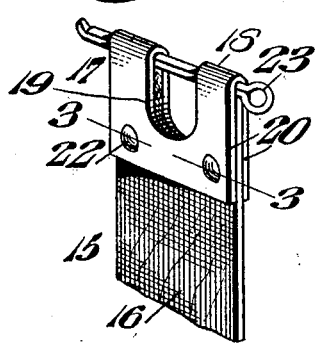 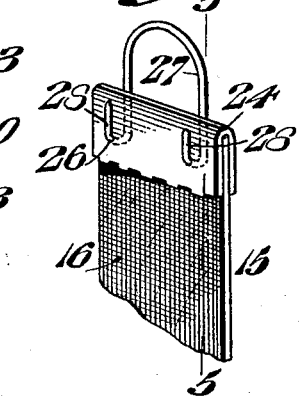 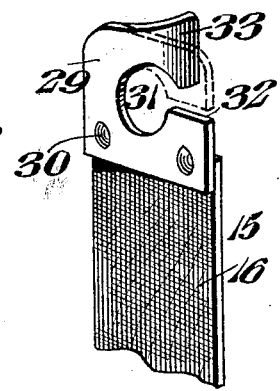
 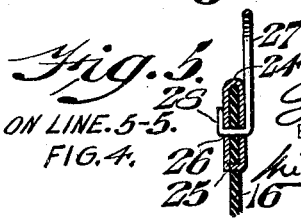
INVENTORS:
Harry W. Jockers
Harry Jefferson
BY
ATTORNEYS.

Patented Apr. 22, 1924.

1,490,926

UNITED STATES PATENT OFFICE.

HARRY W. JOCKERS, OF JENKINTOWN, AND HARRY JEFFERSON, OF PHILADELPHIA, PENNSYLVANIA.

DETACHABLE BRAKE LINING.

Application filed March 29, 1922. Serial No. 547,891.

*To all whom it may concern:*

Be it known that we, HARRY W. JOCKERS, a citizen of the United States, residing at Jenkintown, in the county of Montgomery, State of Pennsylvania, and HARRY JEFFERSON, a citizen of the United States, residing in the city and county of Philadelphia, State of Pennsylvania, have invented a new and useful Detachable Brake Lining, of which the following is a specification.

Our present invention relates to a novel construction and arrangement of a brake lining and more particularly to novel means employed for securing it in assembled position with respect to the brake band.

It is especially designed to be employed in conjunction with brake bands of small or medium sized cars, wherein in order to replace the brake band lining, it is ordinarily necessary to take down the transmission, which, even with a skilled mechanic, takes several hours time; it being necessary to remove the brake band, cut out the rivets and then rivet a new lining in place within the brake band.

In accordance with our present invention, the brake lining is provided with a novel construction of clip which can be assembled in a very few minutes, it being only necessary to expand the brake band without rendering it necessary to disconnect and remove it.

It further comprehends a novel construction and arrangement of fastening means for brake band linings.

It further consists of other novel features of construction, all as will hereinafter more clearly appear in the detailed description of the invention and the appended claims.

For the purpose of illustrating our invention, we have shown in the accompanying drawings typical embodiments thereof which are at present preferred by us, since they will give in practice satisfactory and reliable results. It is to be understood, however, that the various instrumentalities of which our invention consists can be variously arranged and organized, and that our invention is not limited to the precise arrangement and organization of these instrumentalities as herein shown and described.

Figure 1 represents in sectional elevation a portion of a brake mechanism, in conjunction with which a detachable brake lining embodying our invention is employed.

Figure 2 represents view of a portion of the brake lining with its fastening means.

Figure 3 represents a section on line 3—3 of Figure 2.

Figure 4 represets, in perspective, another embodiment of our invention.

Figure 5 represents a section on line 5—5 of Figure 4.

Figure 6 represents, in perspective, another embodiment of our invention.

Similar numerals of reference indicate corresponding parts.

Referring to the drawings:—

1 desigates a driven shaft on which is fixed the brake drum 2 around which is secured the brake band 3 which is provided with the apertured terminal lugs 4 through which passes the shaft 6 which is journaled in the housing 7 and at its inner end in the aperture 8 of the sleeve 9 which is in threaded engagement with the housing 7 and is provided with a lock nut 10.

11 designates a spring interposed between the terminal lugs 4, and the shaft 6 has secured to it a cam 12 which cooperates with a cam face 13 on the housing 7, so that when the arm 14 is rocked, the brake band will be tightened.

The construction just explained is conventional of the intermediate brake band and its actuating means for the transmission used in automobile construction.

15 designates a detachable brake lining embodying our invention which is formed from a treated fabric webbing 16, with which, in the form seen in Figures 1, 2 and 3, a novel construction of a fastening device 17 is employed, which is connected to the free ends of the lining 15.

In its preferred form, this consists of a plate 18 which is provided with a slot 19 and is deflected upon itself to form the parallel sides 20 which are apertured as at 21, see Figure 3, in order to receive the fastening clips 22 which are of the usual type of clip fasteners having the usual head and the prongs, which after being passed through the apertures 21 and through the fabric webbing 16 can be deflected laterally, as will be understood by reference to Figure 3.

23 designates a fastening device such as for example a cotter pin.

In this form of our invention, it will be seen that, assuming that the old lining has been removed, all that it is necessary to do is to slip the new brake lining around between the drum and the brake band and bring its free ends so that the terminal fastening device 17 can be slipped over the shaft 6, whereupon the cotter pin 23 can be passed through the aperture formed between it and the fabric webbing 16 and the parts expeditiously assembled by an inexperienced person in a very few minutes.

It will of course be understood that in case the lining which has been displaced had been riveted to the band in the usual manner, that the rivets which have secured such lining to the brake band must be cut out.

If, however, a detachable lining constructed in accordance with our invention has been secured in position and it is desired to replace it, all that it is necessary to do is to remove the cotter pin 23, whereupon the lining can be removed, as is apparent, without disconnecting the brake band or its operating mechanism, and then a new detachable brake lining constructed in accordance with our invention can be quickly and readily assembled in position.

In the embodiment seen in Figures 4 and 5, the fabric lining 16 is connected with a reinforcing plate 24 which is bent upon itself to surround opposite sides of the free end of the fabric of the lining 16, and at the free end of the plate, it is provided with laterally extending prongs 25, see Figure 5, which pass through the lining and are clinched in position.

Apertures 26 are formed through the reinforcing plate 24 and the lining, and a U-shaped fastening clip 27 is then placed over the shaft 6 and its hook-shaped ends 28 can then be inserted through the aperture 26 so that the free ends of the brake lining can be connected with the shaft 6 so that brake lining can be retained in its proper position.

In the embodiment of our invention shown in Figure 6, we employ for the terminal of the lining 16 the plate 29 secured to a free end of the lining by means of rivets or other fastening devices 30.

This plate 29 is provided with the aperture 31 to receive the shaft 6 and is provided with a cut 32 extending from the aperture 31 through the outer wall and the plate 29 at one side, so as to form a flexible tongue 33, which, after the plate 29 has been assembled with respect to the shaft 6, may be pressed back into the position seen in dotted lines in Figure 6, so that the free ends of the lining will be properly connected with respect to the shaft 6.

It will be seen that in accordance with our present invention, the necessity of riveting linings to the brake band has been entirely dispensed with and also the necessity for employing side clips to prevent lateral movement of the lining with respect to the brake band. It has been found in practice that this is not necessary and that when the brake lining is secured with respect to the shaft 6 in accordance with our present invention, marked and advantageous results are obtained.

In cases where the linings are riveted to the brake band, the rivets bear against the brake drum and an objectionable rattling and noise takes place.

In accordance with our invention, this chattering and noise is eliminated; the rivets are dispensed with, and the fabric lining is the only thing which rides on the brake drum.

The brake band is operated in the usual manner.

For convenience of illustration, we have shown our novel detachable brake lining as applied to the intermediate brake band, of a well known type of transmission, although it will be understood that it is intended to be applied to the other two brake bands.

In prior types of brake linings, if the intermediate brake band is to have its lining replaced with a new lining, it is necessary to drive out the pin which retains the cam 12 on the shaft 6 and remove the shaft 6, which involves a considerable amount of time and expense. In accordance with our present invention such procedure is obviated.

It will thus be apparent that if a lining which has been riveted to the brake band has been removed, all that it is necessary to be to apply a lining of our construction is to move the lining into position and assemble the reinforced terminals with respect to the shaft 6, either by the insertion of the fastening pin 23, fastening devices 27, or by bending the tongue 33 of the reinforcing plate 29 back into the position seen in dotted lines in Figure 6.

It will now be apparent that we have devised a new and useful detachable brake lining which embodies the features of advantage enumerated as desirable in the statement of the invention and the above description, and while we have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described our invention, what we claim as new and desire to secure by Letters Patent, is:

1. A new article of manufacture, comprising a flexible lining adapted to brake bands provided with lugs, said lining having its free ends provided with terminals having openings to receive the rock shaft and register with the brake lugs, and movable means on said terminals for permitting the latter to be attached to and detached from said rock shaft, without dismantling the rock shaft from its bearings.

2. A new article of manufacture, comprising a flexible lining for brake bands provided with lugs, said lining having its free ends provided with terminals to engage the rock shaft and register with the lugs of the brake band, means for assembling said terminals with respect to said rock shaft without removing the latter from its bearings, and movable locking devices to secure said terminals in assembled position with said rock shaft.

3. A new article of manufacture, comprising a flexible lining for brake bands provided with lugs which co-operate with a rock shaft, said lining having its free ends provided with U shaped metal reinforcements and movable means on said reinforcements to permit assembling said free ends in locked condition on said rock shaft.

4. A new article of manufacture, comprising a flexible brake lining for brake bands having only frictional engagement with its brake band and provided with lugs to receive the actuating rock shaft, and movable fastening devices on the free ends of said lugs connectible with and disconnectible from said rock shaft without the use of tools and without dismounting the rock shaft.

HARRY W. JOCKERS.
HARRY JEFFERSON.

Witnesses:
C. D. McVay,
M. E. Byrne.